(12) United States Patent
Ware

(10) Patent No.: US 8,369,164 B2
(45) Date of Patent: *Feb. 5, 2013

(54) BIMODAL MEMORY CONTROLLER

(75) Inventor: Frederick A. Ware, Los Altos Hills, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/103,206

(22) Filed: May 9, 2011

(65) Prior Publication Data

US 2011/0211403 A1 Sep. 1, 2011

Related U.S. Application Data

(63) Continuation of application No. 12/483,732, filed on Jun. 12, 2009, now Pat. No. 7,961,532.

(60) Provisional application No. 61/076,391, filed on Jun. 27, 2008.

(51) Int. Cl.
*G11C 7/10* (2006.01)
(52) U.S. Cl. ............... 365/191; 365/63; 365/189.17
(58) Field of Classification Search ............. 365/189.17, 365/198, 221
See application file for complete search history.

(56) References Cited

U.S. PATENT DOCUMENTS

| | | | |
|---|---|---|---|
| 5,280,601 A * | 1/1994 | Desai et al. ................ | 711/5 |
| 6,253,284 B1 | 6/2001 | Hsu | |
| 6,717,834 B2 | 4/2004 | Zagorianakos | |
| 6,973,516 B1 * | 12/2005 | Athanas et al. ............. | 710/100 |
| 7,961,532 B2 * | 6/2011 | Ware ........................ | 365/191 |

* cited by examiner

*Primary Examiner* — Tan T. Nguyen
(74) *Attorney, Agent, or Firm* — Mahamedi Paradice Kreisman LLP; Lance M. Kreisman

(57) ABSTRACT

A memory controller has a communication path which is coupled to an external, wired electrical path. The memory controller includes at least two alternative interface circuits to communicate with the external, wired electrical path using signals having one of two different formats. Each of the alternative interface circuits is electrically coupled to a corresponding signal connector, and only one of these signal connectors, in turn, is electrically coupled to the external path via an I/O pin or printed-circuit board connection (depending upon implementation). The remaining signal connector may be left electrically uncoupled from the external, wired electrical path, and, if desired, the corresponding remaining interface circuit may be left unused during operation of the memory controller.

23 Claims, 12 Drawing Sheets

```
                                                                    ┌─ 600
┌─────────────────────────────────────────────────────────────────┐
│  PROVIDE A FIRST SET OF SIGNAL CONNECTORS AND CORRESPONDING FIRST │
│   INTERFACE CIRCUITS TO ELECTRICALLY COUPLE AT LEAST PART OF A    │
│  MEMORY-CONTROLLER I/O BUS IN A MEMORY CONTROLLER TO AT LEAST     │
│         PART OF AN EXTERNAL, MEMORY-SYSTEM I/O BUS                │
│                              610                                  │
└─────────────────────────────────────────────────────────────────┘
                                  │
                                  ▼
┌─────────────────────────────────────────────────────────────────┐
│   PROVIDE A SECOND SET OF SIGNAL CONNECTORS AND CORRESPONDING    │
│  SECOND, ALTERNATIVE INTERFACE CIRCUITS TO ELECTRICALLY COUPLE AT │
│   LEAST THE PART OF THE MEMORY-CONTROLLER I/O BUS IN THE MEMORY   │
│  CONTROLLER TO AT LEAST THE PART OF THE EXTERNAL, MEMORY-SYSTEM  │
│                             I/O BUS                               │
│                              612                                  │
└─────────────────────────────────────────────────────────────────┘
                                  │
                                  ▼
┌─────────────────────────────────────────────────────────────────┐
│  SELECTIVELY ELECTRICALLY COUPLE THE MEMORY-CONTROLLER I/O BUS   │
│  WITH THE EXTERNAL, MEMORY-SYSTEM I/O BUS USING EITHER THE FIRST │
│   OF SIGNAL CONNECTORS OR THE SECOND SET OF SIGNAL CONNECTORS    │
│   BASED ON COMMUNICATION CHARACTERISTICS OF A MEMORY SYSTEM,     │
│   WHERE A REMAINING SET OF SIGNAL CONNECTORS, WHICH CAN BE EITHER │
│    THE FIRST SET OF SIGNAL CONNECTORS OR THE SECOND SET OF SIGNAL │
│  CONNECTORS, REMAINS SELECTIVELY ELECTRICALLY UNCOUPLED FROM THE │
│               EXTERNAL, MEMORY-SYSTEM I/O BUS                     │
│                              614                                  │
└─────────────────────────────────────────────────────────────────┘
```

IDENTIFY WHICH ONE OF A FIRST INTERFACE CIRCUIT AND A SECOND INTERFACE CIRCUIT TO USE TO COMMUNICATE SIGNALS VIA AN EXTERNAL, ELECTRICAL PATH, WHICH IS ELECTRICALLY COUPLED WITH A MEMORY CONTROLLER, WHERE THE FIRST INTERFACE CIRCUIT COMMUNICATES FIRST SIGNALS HAVING A FIRST COMMUNICATION FORMAT AND THE SECOND INTERFACE COMMUNICATES SIGNALS HAVING A SECOND COMMUNICATION FORMAT
660

COMMUNICATE WITH THE EXTERNAL ELECTRICAL PATH USING THE IDENTIFIED INTERFACE CIRCUIT
662

FIG. 6B

BIMODAL MEMORY CONTROLLER

RELATED APPLICATION

This application is a continuation of, and hereby claims priority under 35 U.S.C. §120 to, a co-pending parent U.S. patent application Ser. No. 12/483,732, filed on 12 Jun. 2009, entitled "Bimodal Memory Controller,", by inventor Frederick A. Ware. This parent application and the instant application claim priority under 35 U.S.C. §119 to U.S. Provisional Application No. 61/076,391, entitled "Bimodal Memory Controller," by Frederick A. Ware, filed 27 Jun. 2008.

TECHNICAL FIELD

The present embodiments relate to memory controllers. More specifically, the present embodiments relate to memory controllers that support communication with memory devices having different communication formats.

BACKGROUND

Different types of digital systems may employ different communication formats. For example, high-speed memory systems may utilize different signaling rates, voltages, impedances, common-mode signaling levels, termination structures (such as ground-referenced common-mode signaling levels) and communication formats than other memory systems. The nature of different communication formats makes it difficult to support support multiple formats on a single interface circuit, particularly where the formats in question diverge in driving voltage, currents and signaling rates. Furthermore, as digital components continue to decrease in die size, there is a trend to simplify pin counts and the number of input and output signals. Consequently, designers tend to design digital components (especially microprocessors and controllers and the like) in a manner dedicated to a single communications format.

Hence, there is a need to reduce costs and otherwise improve the marketability of digital components by enabling them to adapt to multiple communication formats without substantially increasing pin count, and without requiring platform-specific designs. This need also exists in the field of memory, where is desired to produce memory components that can support communication parameters for diverse systems.

BRIEF DESCRIPTION OF THE FIGURES

FIG. 6A is a flow chart illustrating an embodiment of a process for assembling a memory system.

FIG. 6B is a flow chart illustrating an embodiment of a process for operating a memory controller.

Note that like reference numerals refer to corresponding parts throughout the drawings.

DETAILED DESCRIPTION

Figure 1A:
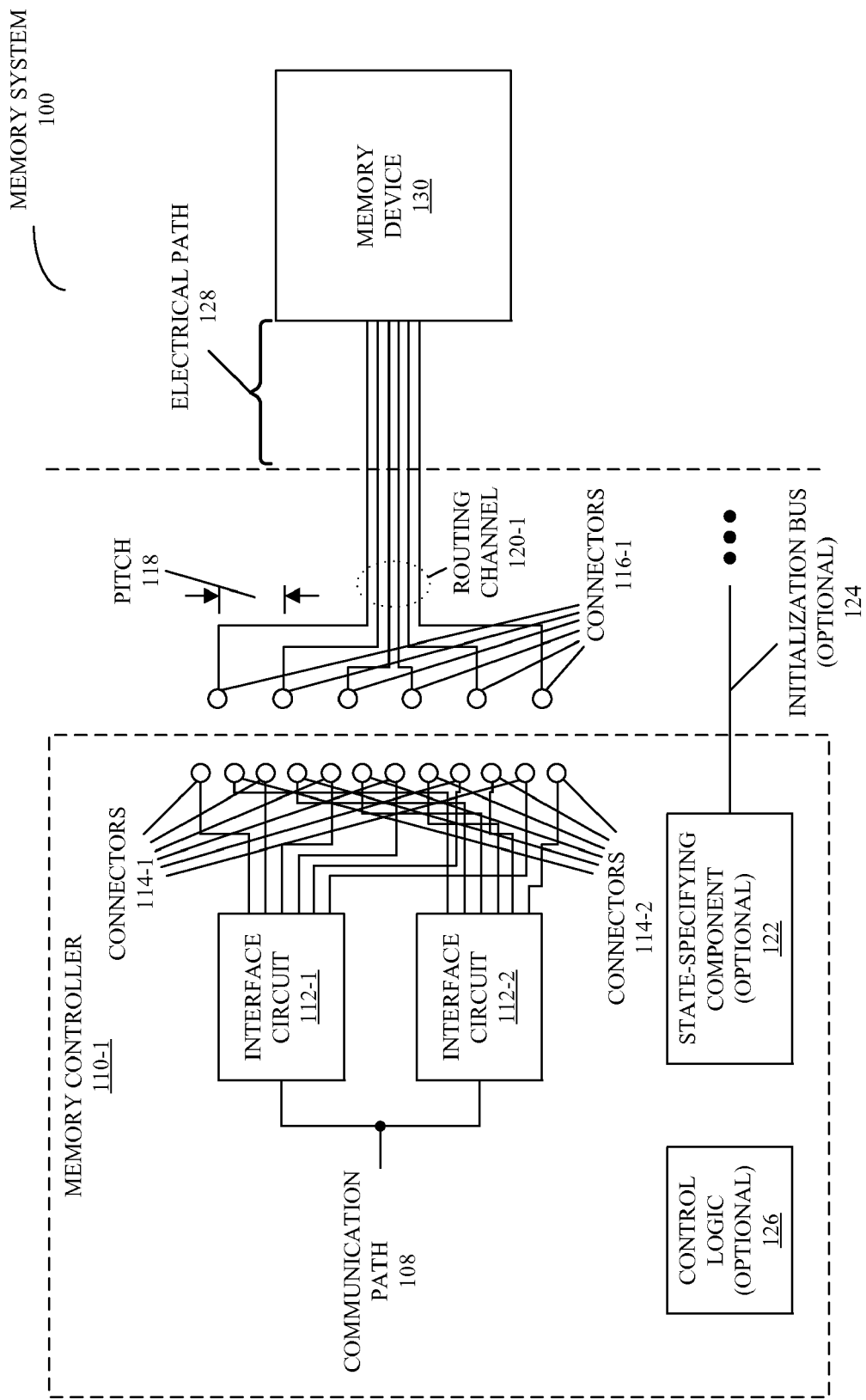
FIG. 1A is a block diagram illustrating an embodiment of a memory system.

FIG. 1A presents a block diagram illustrating an embodiment of a memory system 100. In this memory system, memory controller 110-1 includes separate interface circuits 112-1 and 112-2, which are, respectively, electrically coupled to connectors 114-1 and 114-2, and which are electrically isolated from one another. A given interface circuit, such as interface circuit 112-1, can communicate information (such as commands, addresses, and/or data) from a communication path 108 (which is internal to memory controller 110-1) to memory device 130 via an external, electrical path 128 (such as at least a portion of a memory-system bus), which may be wired or wireless, using a signal format (or, more generally, a communication format) that is different than the signal format of the other interface circuit. By electrically coupling only one of connectors 114-1 or 114-2 to corresponding connectors 116-1 during assembly of memory system 100 (for example, using solder balls and/or bonding wires), one of the interface circuits 112 can communicate the information to memory device 130 during operation of the memory controller 110-1, while the other one of the connectors 114 remains electrically uncoupled to connectors 116-1. In particular, connectors 114-1 and 116-1 or connectors 114-2 and 116-1 can be electrically coupled based on communication characteristics associated with memory device 130. If desired, the interface circuit associated with the uncoupled connectors 114 may remain unused during the operation of the memory controller 110-1.

Note that memory controller 110-1 includes two connectors (i.e., in connectors 114-1 and 114-2) for each connector (e.g., as represented in a package or a printed circuit board). A number of different embodiments may be used to selectively connect one of the memory-controller connectors 114-1 or 114-2 to the connectors 116-1. For example, as described below with reference to FIG. 2A, a single memory controller and a single printed circuit board may be combined with one of two alternative packages to electrically couple an associated one of connectors 114-1 and 116-1 or connectors 114-2 and 116-1 during assembly of memory system 100 (e.g., based solely on the choice of the alternative package). Alternatively, as described below with reference to FIG. 2B, a single memory controller and a single package may be combined with one of two alternative printed circuit boards to electrically couple connectors 114-1 and 116-1 or connectors 114-2 and 116-1 during assembly of memory system 100 (for example, the printed circuit board may have reciprocal connectors corresponding to alternative connectors 114-1 or 114-2, but connect the external electrical path 128 to only one set of reciprocal connectors). Other specific embodiments are also presented below.

The principles introduced above may allow a single memory controller to support different communication formats, such as those associated with different memory devices or applications (such as extreme data rate and double data rate), without compromising the performance associated with either communication format. In particular, these principles may provide additional degrees of design freedom by not sharing a single interface circuit for the different communication formats. Thus, relative to each other, the interface circuits 112 may have: different voltage swings, different transistor sizes, different parasitic capacitance, different breakdown voltages, different electrostatic-discharge protection circuits, and/or different data rates. Therefore, these principles can increase the level of system integration and reduce the expense of components in memory system 100. As mentioned above, note that in the embodiment shown in FIG. 1A, one interface circuit 112-1 or 112-2 may be left electrically isolated and not connected to connectors 116-1 (and to the associated external electrical path 128). This design choice may be advantageous as, for some communication formats, the components needed to support one format may create parasitic effects that would unacceptably interfere with communications using a different format (e.g., parasitic capacitance for an unused driver could degrade the data eye associated with a higher speed communication format). By leaving one interface circuit electrically isolated from the external electrical path 128, the embodiment shown in FIG. 1A may be used to support diverse multiple formats while minimizing electrical degradation introduced by unused interface circuits.

These integrated circuits and techniques may be used in a wide variety of systems, including with a wide variety of memory systems and memory devices, including: volatile memory, non-volatile memory, dynamic random access memory (DRAM), static random access memory (SRAM), read-only memory (ROM), erasable programmable read-only memory (EPROM), electrically erasable programmable read-only memory (EEPROM), flash, solid-state memory, and/or other types of memory. Moreover, for a given type of memory, these techniques may be used in different memory technologies or technology generations (which may use different power supply voltages or signaling rates). For example, these techniques may be used in extreme data rate (XDR), double-data rate (DDR), graphics double-data rate (GDDR) and/or synchronous DRAM, such as: DDR2, DDR3, DDRx, GDDR1, GDDR3, GDDR5, and/or mobile DDR.

Additionally, integrated circuits and/or memory components (such as a memory controller, a memory device, a memory module, and/or a memory system) that use these techniques may be included in a wide variety of applications, such as: desktop or laptop computers, computer systems, hand-held or portable devices (such as personal digital assistants and/or cellular telephones), set-top boxes, home networks, and/or video-game devices. For example, a storage device (such as the memory module) may be included in computer main memory. Moreover, one or more of these embodiments may be included in a communication channel, such as: serial or parallel links, metropolitan area networks, local area networks (LANs), and/or personal area networks (PANs).

Embodiments of a bimodal memory controller are now further described. Continuing the discussion of FIG. 1A, one of the challenges associated with separate interface circuits 112 is presented by the general trend to minimize pin count and the number of input/output signals. In particular, for a given die, chip size or configuration, there may be limits on the number of bonding wires that can be used to connect to the die or chip. For example, for a given perimeter of a die, constraints on the bonding-wire pitch typically limit the maximum number of connections that can be made, for example, by bonding wires. Similarly, for implementations which rely on solder ball attachment, there are often limits on the number of solder balls that can carry signals.

As described further below, in some embodiments memory controller 110-1 may address the packaging and electrical constraints by positioning connectors 114-1 and 114-2 in physically separate (as opposed to interdigited) but adjacent groups of connectors that are parallel to the periphery of the die. Connectors in these groups may have the same pitch 118. For example, the connectors may be bonding pads, which can be relatively small compared to bonding wire size for a conventional package that is used to mount an integrated circuit. These bonding pads may be positioned next to each other in a conventional profile such that the package may be electrically coupled to bonding pads in only one of the groups of the connectors, i.e., the pitch 118 may accommodate a single bonding wire. In this way, the memory controller 110-1 can accommodate two configurations (which are associated with a particular one of interface circuits 112 and connectors 114) without using twice as many bonding wires or requiring an increase in the size of the chip or its periphery. Moreover, this configuration, in which one of multiple pads can be electrically coupled to a bonding wire, facilitates communication using alternate communication formats without introducing impedance problems that would occur if both of the bonding pads were electrically coupled to each other and the memory device 130.

While the preceding example uses bonding pads as illustration, connectors 114-1, 114-2 and 116-1 should be understood to include metal contacts, pads and other forms of electrical coupling of an integrated circuit to the outside world (such as pads for solder balls). Thus, these connectors should be understood to include any type of connector that would be suitable for this purpose.

Signal lines, links or wires that are coupled to one of the connectors 114-1 or 114-2 may be passed through a wired, routing channel 120-1 to external electrical path 128. Moreover, the active one of the interface circuits 112 may communicate information on a single line or multiple lines in external electrical path 128 (such as those in a data bus, an address bus, or some other specific-purpose bus). For example, the active one of the interface circuits 112 may communicate information on a set of pins, for example, all data bus, data-bus and address, or any other set or subset of lines in a bus between memory controller 110-1 and memory device 130. In some embodiments, signals are communicated via the external electrical path 128 using serial and/or parallel communication. Moreover, at least some of the signal lines, links or wires in the external electrical path 128 may be capable of bidirectional communication (such as half-duplex or full-duplex communication).

In some embodiments, memory controller 110-1 includes an optional state-specifying component 122 that specifies, based on the communication characteristics associated with memory device 130, which of the interface circuits 112 is used during operation of the memory controller 110-1. For example, the state-specifying device may include: a mode register that stores a state setting that indicates which of the interface circuits 112 is used; a fuse, whose state (open or closed) indicates which of the interface circuits 112 is used; a connector that receives a voltage (such as high or low) that indicates which of the interface circuits 112 is used; and/or a node electrically coupled to an optional initialization bus 124, which receives state-specifying information that indicates which of the interface circuits 112 is used. Other forms of specifying the connection state between memory controller 110-1 and memory device 130 will also occur to those having familiarity with systems logic design.

Alternatively, memory controller 110-1 may include optional control logic 126 to determine whether connectors 114-1 or 114-2 are electrically coupled, respectively, to connectors 116-1 (and thus, to memory device 130). Based on this determination, optional control logic 126 may activate the corresponding one of the interface circuits 112, and, if desired, may deactivate the unused one of the interface circuits 112.

Figure 1B:
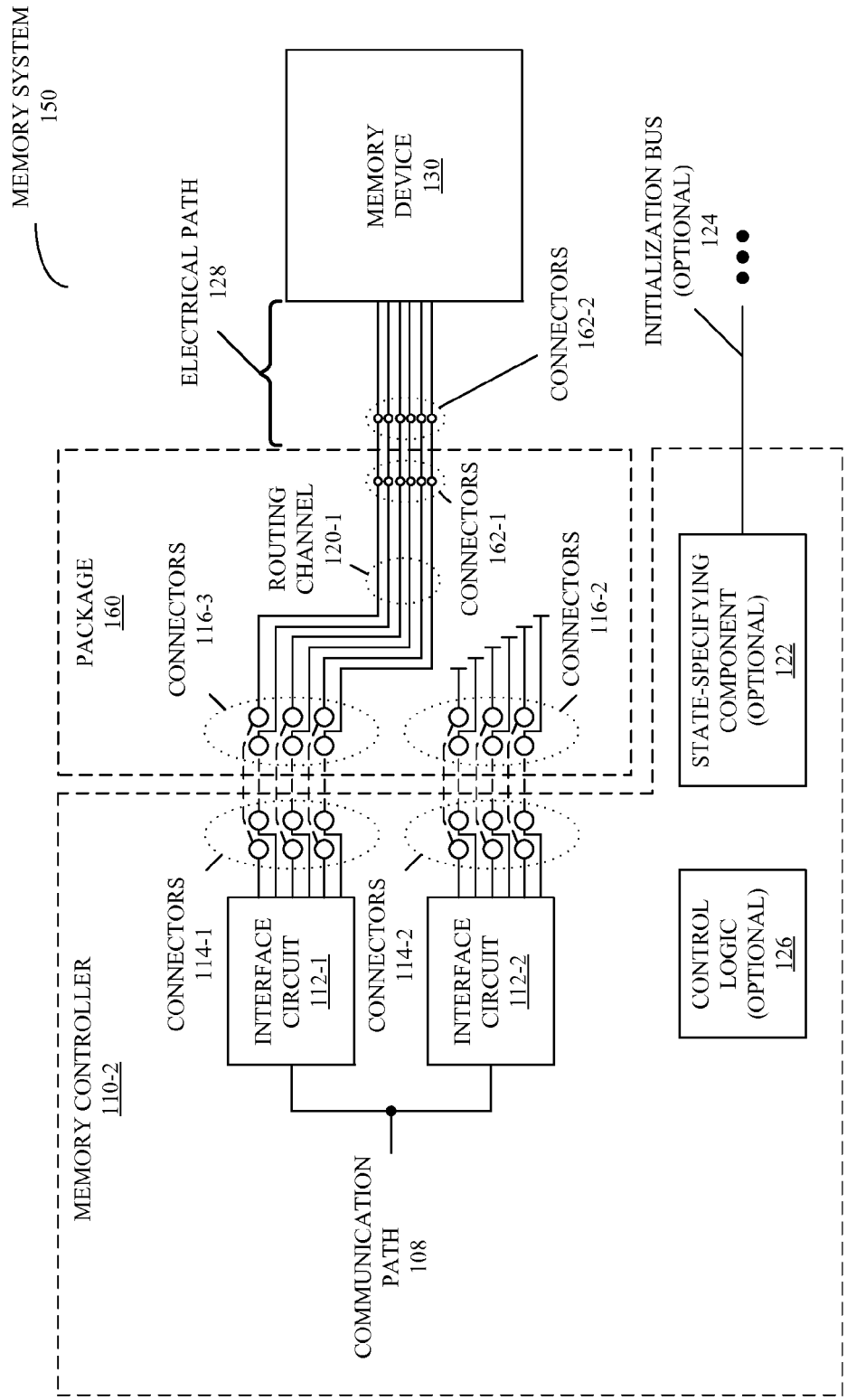
FIG. 1B is a block diagram illustrating an embodiment of a memory system.

In some embodiments, connectors 114-1 and 116-3, as well as connectors 114-2 and 116-2, are electrically coupled, but only one of these pairs, such as connectors 114-1 and 116-3, is electrically coupled to memory device 130. This is shown in FIG. 1B, which presents a block diagram of memory system 150. In this system, only one of connectors 116 in an application-specific package 160 are electrically coupled by wired, routing channel 120-1 to connectors 162-1, which, in turn, are electrically coupled to connectors 162-2, and ultimately, to memory device 130.

Figure 2A:
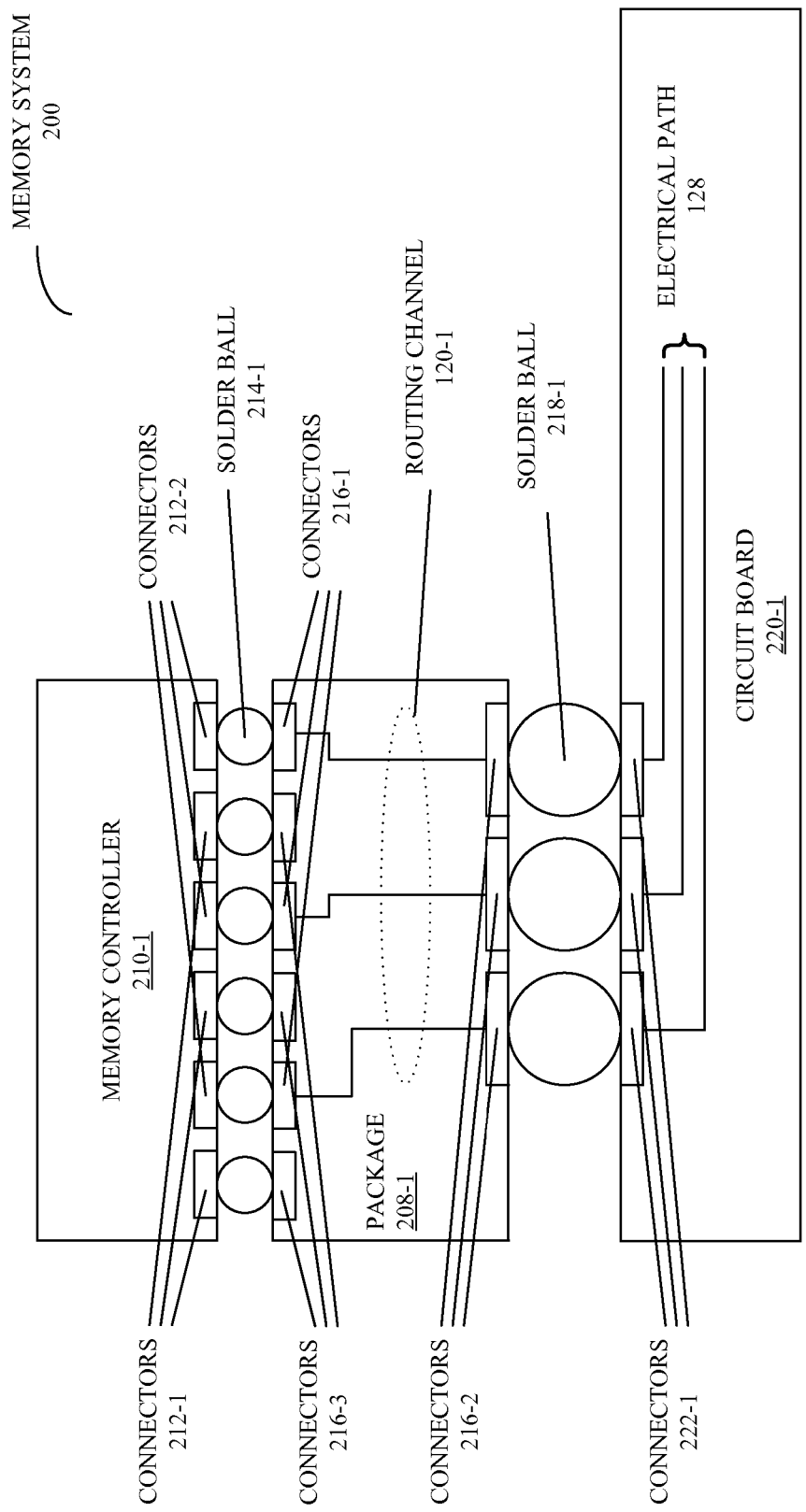
FIG. 2A is a block diagram illustrating an embodiment of a memory system.

FIG. 2A shows a side-view of an embodiment of a memory system 200 in which multiple alternative connectors are passed from memory controller 210-1 through to package 208-1, and where the package 208-1 is relied upon to couple one alternative set of interface circuits to the external signal path 128. In particular, the package 208-1 may be coupled to a die by a number of solder ball, such as solder ball 214-1, where both sets of interface circuit are electrically coupled, via connectors 212-1 and 212-2, to reciprocal pads or connectors 216-1 and 216-3 on the package 208-1, but where the package 208-1 electrically couples only one set of these connectors to a printed circuit board 220-1. In particular, a number of connectors 212-1 and 212-2 are each associated with one of at least two separate interface circuits. Each group of connectors 212-1 or 212-2 may be alternatively used to communicate information (using different communication formats) between a chip (such as a memory controller 210-1) and external electrical path 128 in printed circuit board 220-1 via package 208-1. Connectors 212-1 and 212-2 are electrically coupled to solder balls 214 (such as C4 balls), which are electrically coupled to reciprocal connectors 216-1 and 216-3 on package 208-1. However, only one of these groups of reciprocal connectors (such as connectors 216-1) are electrically coupled to connectors 216-2, for example by the wired, routing channel 120-1 (which may run along a surface of package 208-1 and/or which may include vias in package 208-1). In turn, connectors 216-2 are electrically coupled to connectors 222-1 by solder balls 218 (such as a ball grid array).

In another version of package 208-1, connectors 216-3 (instead of connectors 216-1) may be electrically coupled by the wired, routing channel 120-1 to connectors 216-2, and thus, to the memory device (not shown). Consequently, memory systems 150 (FIG. 1B) and 200 illustrates a configuration in which the same memory controller 210-1 and printed circuit board 220-1 support different memory devices and/or applications, which have different communication protocols, using an appropriate one of two alternative versions of package 208-1.

In some embodiments, rather than selectively electrically coupling connectors 216-1 or connectors 216-3 to connectors 216-2 via wired, routing channel 120-1, either connectors 216-1 or connectors 216-3 are electrically coupled to corresponding connectors 212-2 or connectors 212-1, respectively. For example, in one embodiment, a solder ball may be deliberately omitted between some of these pairs of connectors in order to isolate an interface circuit in the controller. Alternatively, this approach may be implemented between some of connectors 216-2 and connectors 222-1.

Figure 2B:
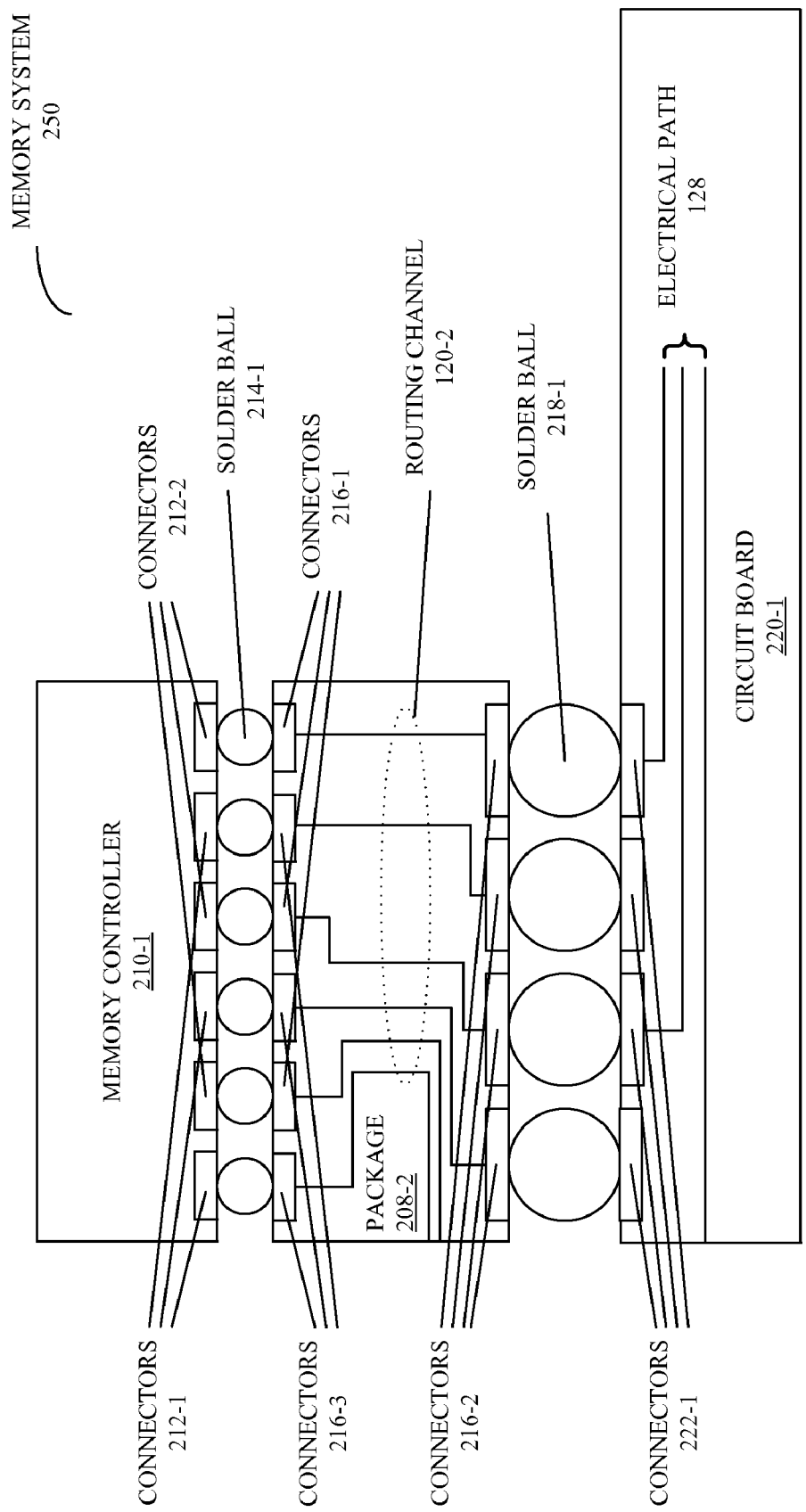
FIG. 2B is a block diagram illustrating an embodiment of a memory system.

In yet another variation on this technique, the selective electrical coupling may be implemented in the printed circuit board (as opposed to the package). Thus, the same memory controller and package may be used with an appropriate one of two versions of the printed circuit board (depending on the communication format of the memory device). This is shown in FIG. 2B, which presents a block diagram illustrating an embodiment of a memory system 250. In this system, package 208-3 is common to both communication formats (or applications), but only a subset of connectors 216-2 (which are electrically coupled to one of the two interface circuits in memory controller 210-1, and which are electrically coupled to connectors 222-1 by solder balls 218) are uniquely electrically coupled to the memory device (not shown). In particular, only a subset of the connectors 222-1 are electrically coupled to the external electrical path 128.

While the preceding memory systems in FIGS. 2A-2B illustrate configurations where there are multiple versions of a package or a printed circuit board depending on the communication characteristics associated with the memory device, in other embodiments the package (in FIG. 2A) or the printed circuit board (in FIG. 2B) may also be common for different memory devices or applications having different communication formats. For example, this common component may have two orientations. In a first orientation, connectors may electrically couple one of the interface circuits in the memory controller to the memory device. And in a second orientation (such as one obtained by rotating the common component, in the plane of the connectors, by 180°), additional connectors may electrically couple the other of the interface circuits in the memory controller to the memory device. For example, by presenting an even number of mounting pads on the die-receiving side of a package, in a symmetrical arrangement, with every other pad coupled through-package to the printed circuit board, it might be possible to use one package configuration to support alternative connection schemes (e.g., by rotating the package through its direction of symmetry).

Figure 3A:
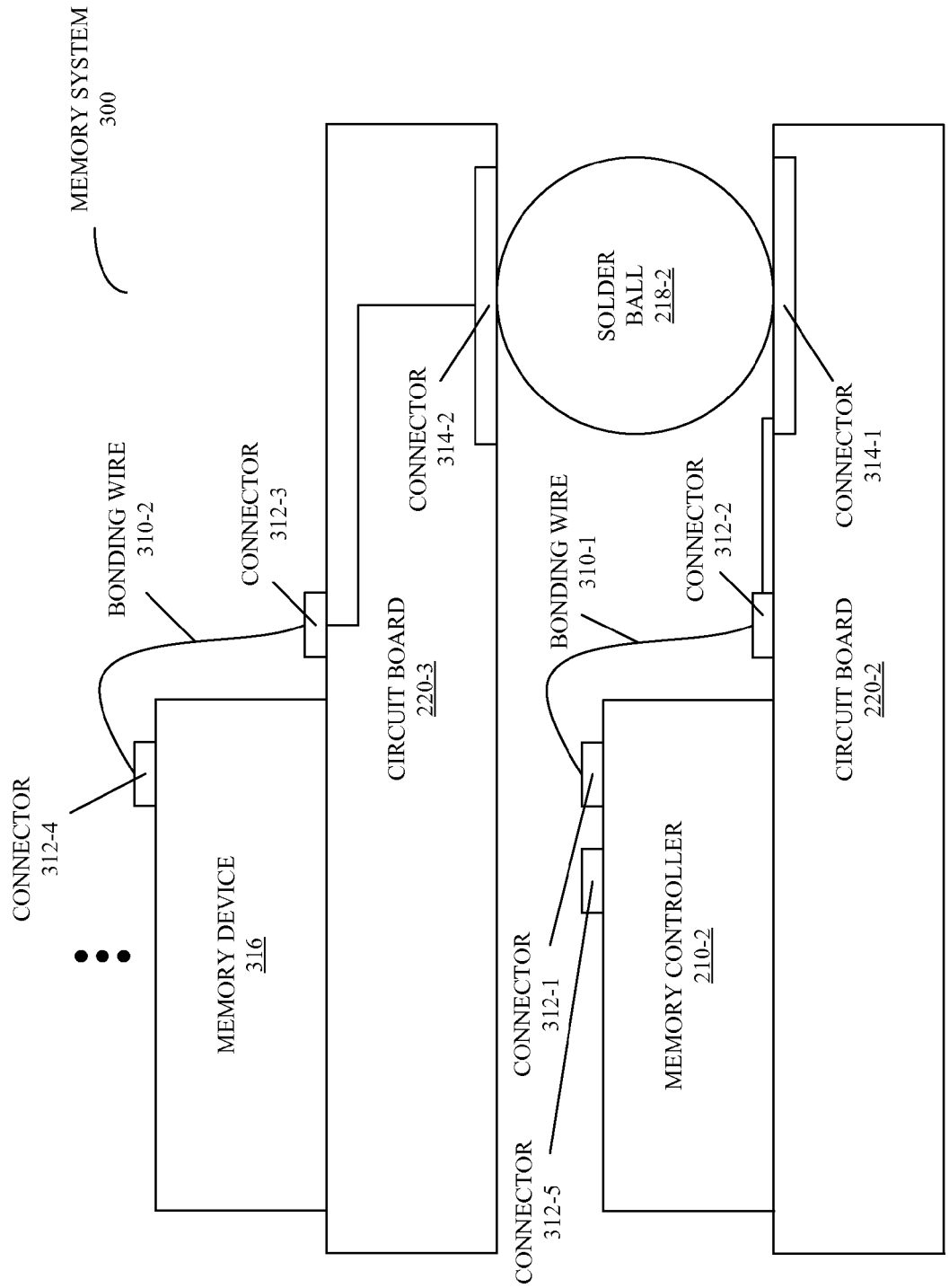
FIG. 3A is a block diagram illustrating an embodiment of a memory system.
Figure 3B:
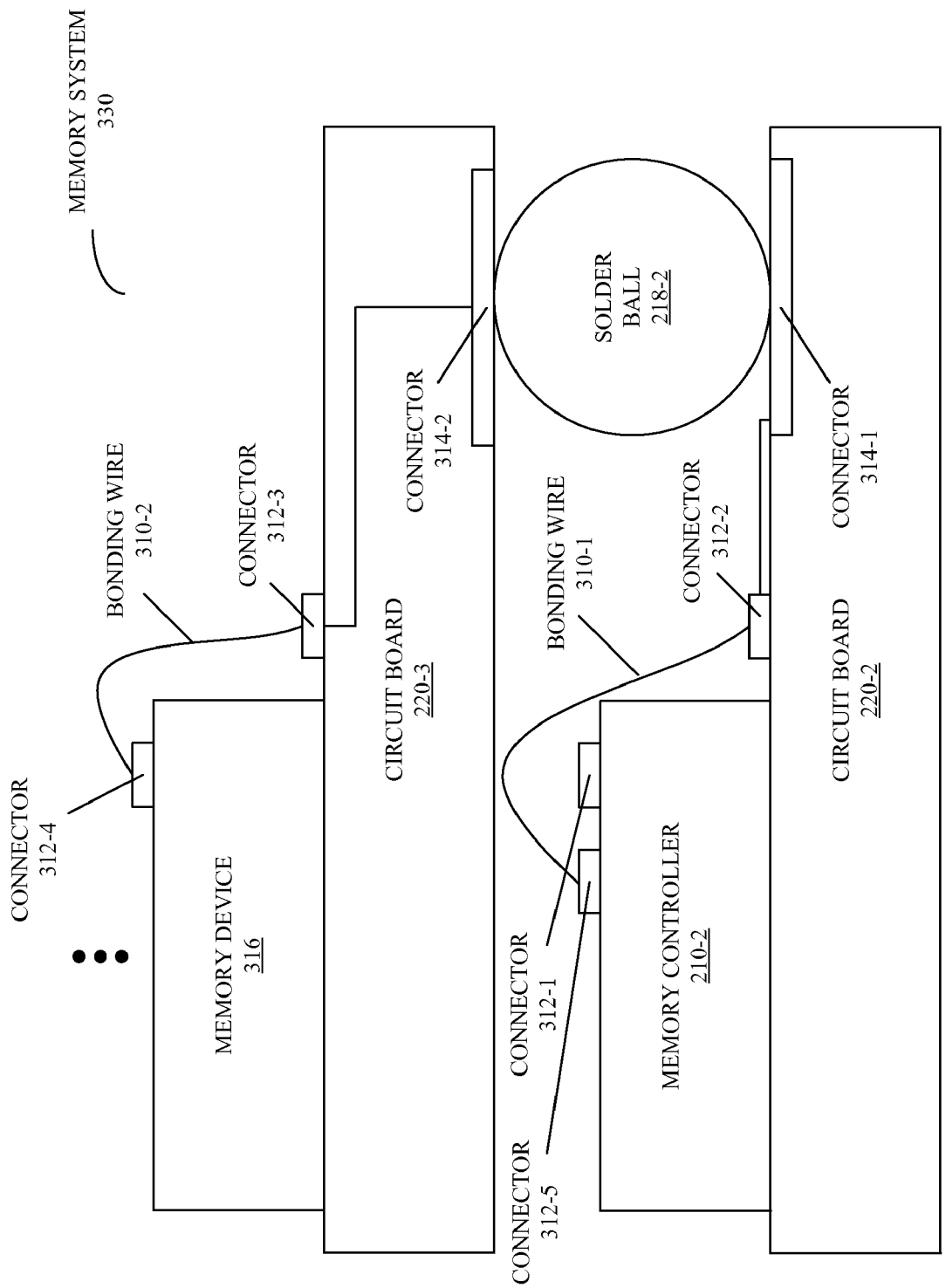
FIG. 3B is a block diagram illustrating an embodiment of a memory controller.

As noted previously, in some embodiments the selective electrical coupling is implemented using wire bonding. This is shown in FIG. 3A, which presents a block diagram illustrating an embodiment of a memory system 300. In particular, bonding wire 310-1 may electrically couple only one of bonding-pad connectors 312-1 and 312-5 (in this example, bonding-pad connector 312-1) on memory controller 210-2 (which is associated with one of the interface circuits) to bonding-pad connector 312-2 on circuit board 220-2. (In contrast with FIG. 3A, FIG. 3B illustrates a memory system 300 in which bonding-pad connector 312-5 is electrically coupled to bonding-pad connector 312-2 by bonding wire 310-1.) Bonding-pad connector 312-2 is electrically coupled to connector 314-1, which is electrically coupled to connector 314-2 on printed circuit board 220-3 by solder ball 218-2 (such as a C4 ball or a ball in a ball grid array). In turn, connector 314-2 is electrically coupled to bonding-pad connector 312-3, which is electrically coupled by bonding wire 310-2 to bonding-pad connector 312-4 on memory device 316. In some embodiments, there may be additional instances of memory devices in a die stack that are, respectively, electrically coupled to one of two or more alternative interface circuits on memory controller 210-2 via a similar electrical path.

Note that using one bonding wire, such as bonding wire 310-1, to electrically couple to only one of bonding-pad connectors 312-1 and 312-5 allows memory controller 210-2 to accommodate multiple communication formats without increasing the number of bonding wires electrically coupled to this memory controller (and, thus, without impacting the periphery requirement or cooling requirements of memory controller 210-2).

Figure 3C:
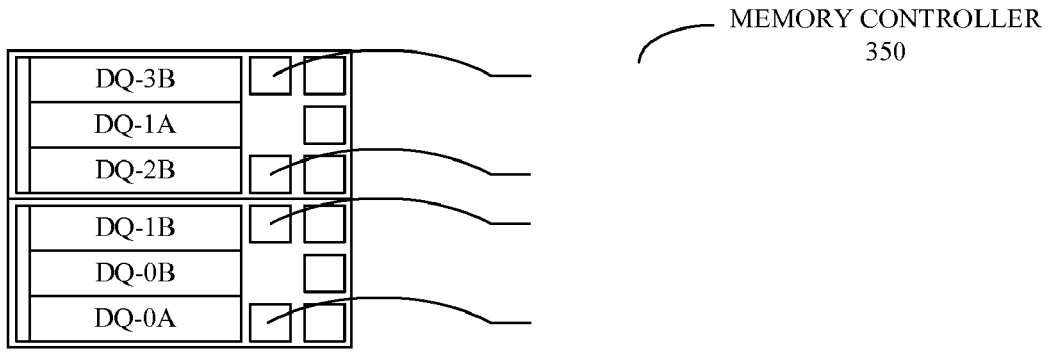
FIG. 3C is a block diagram illustrating an embodiment of a memory controller.
Figure 3D:
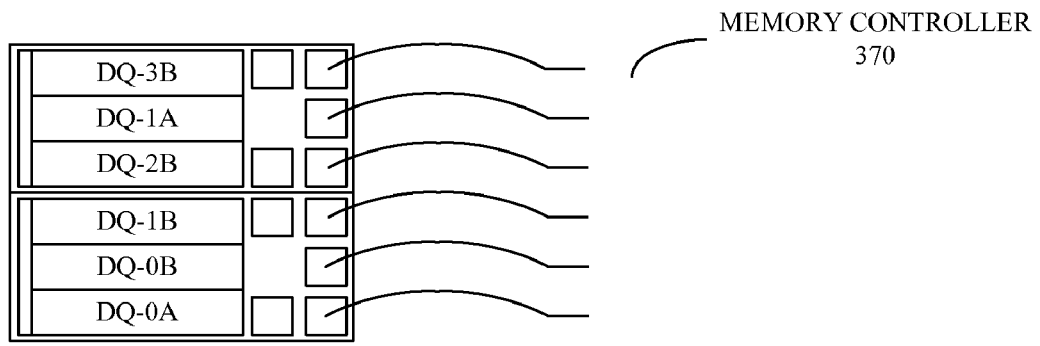
FIG. 3D is a block diagram illustrating an embodiment of a memory controller.

In some embodiments, the alternative bonding-pad connectors may include single-ended and differential configurations. This is shown in FIG. 3C, which presents a block diagram illustrating an embodiment of a memory controller 350. In particular, the wired pairs of pads on the left-hand side are, respectively, associated with differential output paths 0 and 1 for data (DQ) interface A. In contrast, the wired pads on the right-hand side in FIG. 3D, which presents a block diagram illustrating an embodiment of a memory controller 370, show alternative single-ended output paths 0-3 for DQ interface B.

Figure 3E:
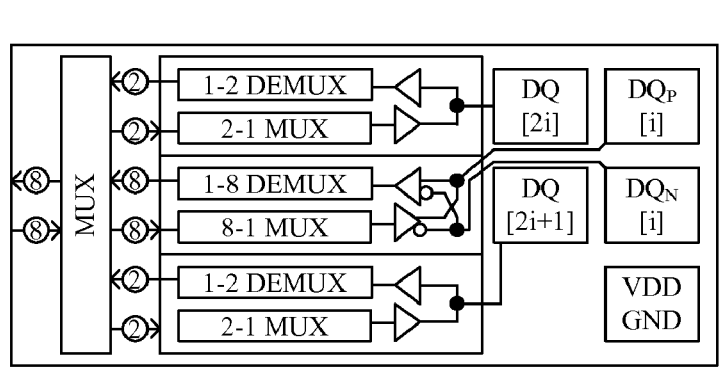
FIG. 3E is a block diagram illustrating an embodiment of a memory controller.

Another example of the alternative interface circuits and their associated bonding-pad connectors is shown in FIG. 3E presents a block diagram illustrating an embodiment of a memory controller 390. Note that these alternative interface circuits share a common multiplexer, as well as additional logic functions in memory controller 390. Consequently, proximate bonding-pad connectors, associated with alternative interface circuits, allows these memory controllers to support multiple communication formats even when the bonding-wire connector pitch is sufficient to accommodate a single bonding wire. Moreover, by selectively electrically coupling only one set of the two or more alternative bonding-wire connectors to a memory device (and leaving the remaining bonding-wire connectors open), this approach permits the active one of the interface circuits to be used without having its performance affected by the impedance associated with the other interface circuits.

Figure 4:
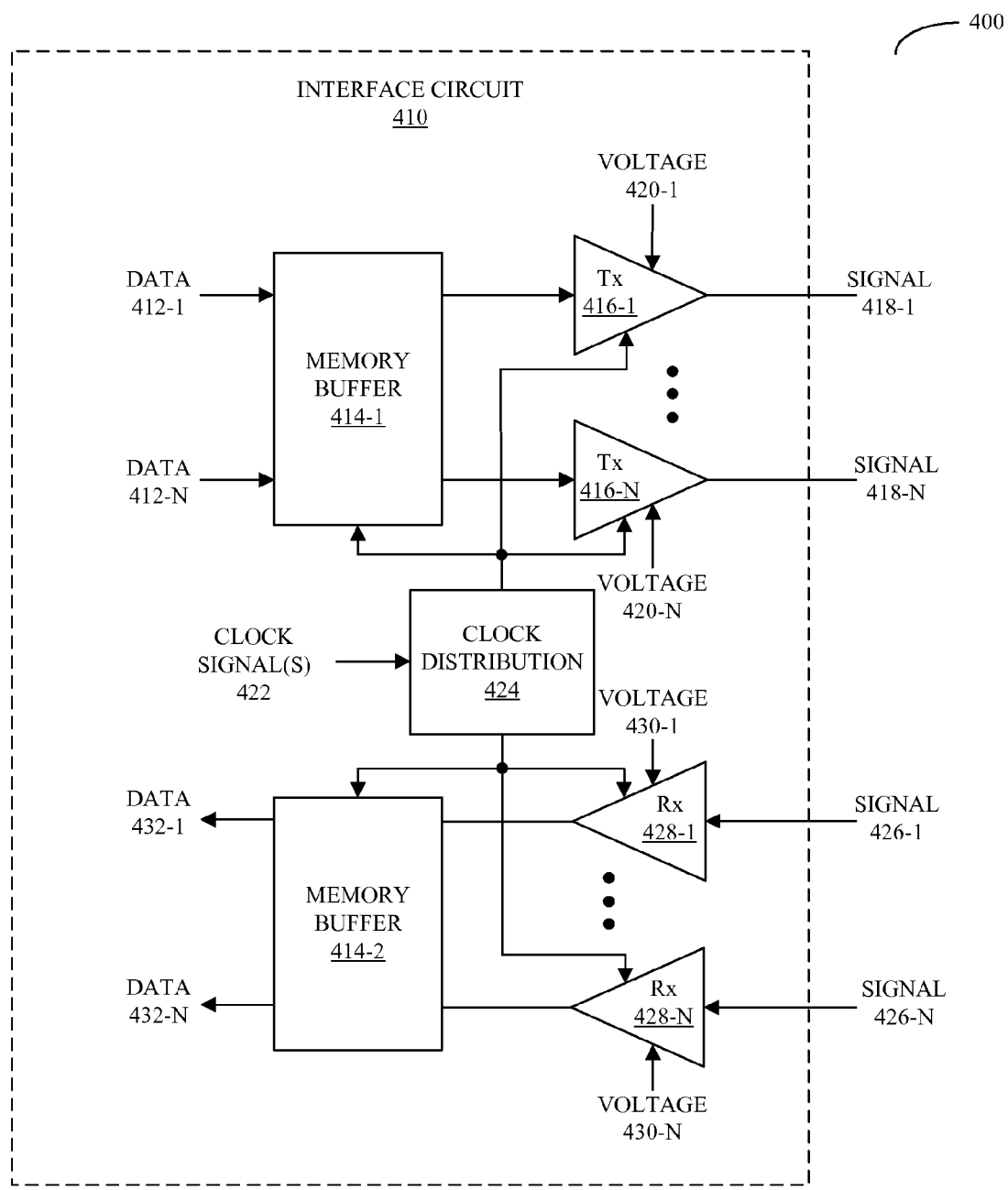
FIG. 4 is a block diagram illustrating an embodiment of an interface circuit.

Embodiments of a given interface circuit in the memory controller (such as one of the memory controllers 110 in FIGS. 1A and 1B) are now described. FIG. 4 presents a block diagram illustrating an embodiment 400 of an interface circuit 410. Data 412 (and/or addresses and commands) to be transmitted by interface circuit 410 to a memory device is temporarily stored in memory buffer 414-1. Then, the data 412 is forwarded to driver circuits (Tx) 416, and is transmitted as (analog or digital) signals 418 onto wired, wireless, and/or optical links in a memory-system bus.

Similarly, signals 426 may be received from the memory device using receiver circuits (Rx) 428, which include detection circuits (such as slicer circuits) to determine data 432 (and/or addresses and commands) from the signals 426. (As noted previously, signals 418 and 426 may be electrically coupled to one group of alternative connectors, such as those in a package, and ultimately to an external path. In some embodiments, signals 418 and 426 are communicated via a bidirectional bus.) This data 432 may be temporarily stored in memory buffer 414-2.

In interface circuit 410, timing of the forwarding, driving, and/or receiving may be gated by one or more timing signals provided by clock distribution 424. Consequently, signals 418 may be transmitted (or driven) and/or signals 426 may be received based on either or both edges in the one or more timing signals. Moreover, in some embodiments, transmitting and receiving may be synchronous and/or asynchronous.

These timing signals may be generated based on one or more clock signals 422, which may be generated off-chip or on-chip (for example, using a phase-locked loop and one or more reference signals provided by a frequency reference, and which are communicated using a dedicated clock-forwarding link or by recovering an embedded clock signal). Moreover, voltage levels and/or a voltage swing of the signals 418 may be based on voltages 420 provided by a power supply (not shown), and logic levels of the data 432 may be based on voltages 430 provided by the power supply. These voltages may be fixed or may be adjustable.

As noted previously, the different interface circuits in the memory controller may correspond to different communication formats. Thus, driver and receiver circuits in one of the interface circuits may have a lower voltage swing, less input/output (I/O) capacitance, and/or a larger data rate than driver and receiver circuits in the other of the interface circuits. Consequently, to avoid the impedance associated with the other of the interface circuits impacting the one of the interface circuits, only the one of the interface circuits is electrically coupled to the external path. Moreover, the driver and receiver circuits in the two separate interface circuits may have different breakdown voltages and/or different electrostatic-discharge protection circuits.

The driver circuits in a first interface circuit may support a lower data rate, while a second interface circuit may support a higher data rate. Moreover, the first interface circuit may include: single-ended drivers, series-source termination, current-mode signaling, and/or strobed clocking Additionally, the second interface circuit may include: differential drivers, parallel termination, voltage-mode signaling, and/or an adjustable transmit/receive clock signal.

Memory systems 100 (FIG. 1A), 150 (FIG. 1B), 200 (FIG. 2A), 250 (FIG. 2B), 300 (FIG. 3A), 330 (FIG. 3B), 350 (FIG. 3C), 370 (FIG. 3D), 390 (FIG. 3E), and/or interface circuit 410 may include fewer components or additional components. Moreover, two or more components may be combined into a single component and/or the position of one or more components may be changed.

Components and/or functionality illustrated in these embodiments may be implemented using analog circuits and/or digital circuits. Furthermore, the components and/or the functionality may be implemented using hardware and/or software. For example, memory controllers 110 (FIGS. 1A and 1B) may be included in a processor or a processor core.

Figure 5A:
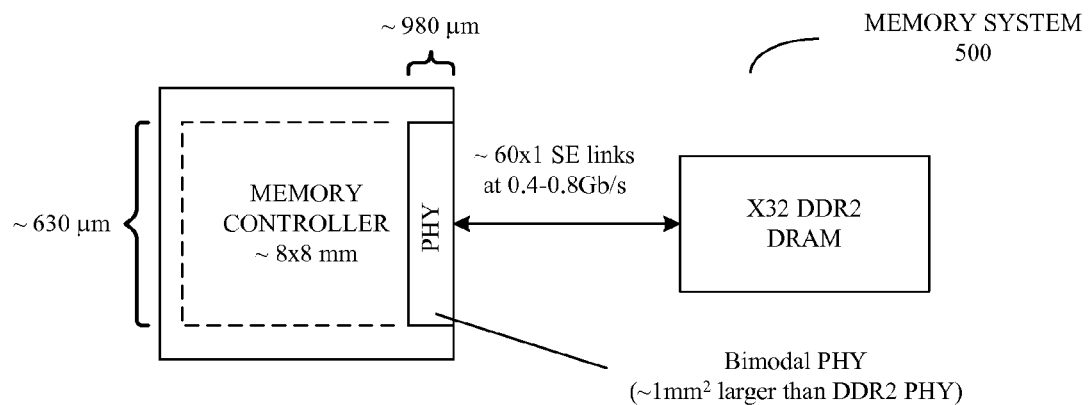
FIG. 5A is a block diagram illustrating an embodiment of a memory system.

In an exemplary embodiment, the first interface circuit in the memory controller supports up to 20 unidirectional single-ended links that operate at 0.4 Gb/s and 40 bidirectional single-ended links that operate at 0.8 Gb/s using a low-power DDR2 communication format. This is shown in FIG. 5A presents a block diagram illustrating an embodiment of a memory system 500. The communication format in memory system 500 may include: a low voltage of approximately 0.2 V, a high voltage of approximately 1.0 V, a VDDQ of approximately 1.2 V, an input capacitance of approximately 5 pF, and a signaling rate of up to 0.8 Gb/s.

Figure 5B:
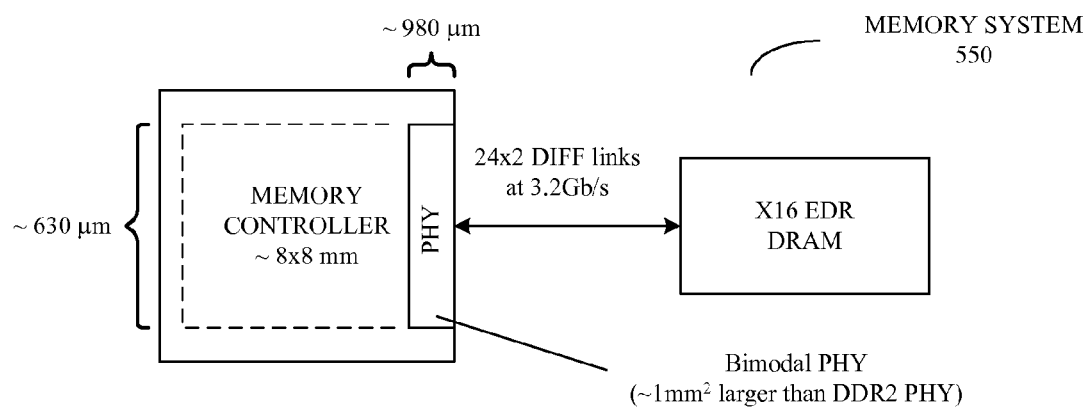
FIG. 5B is a block diagram illustrating an embodiment of a memory system.

The second interface circuit may support up to 24 differential links that operate at 3.2 Gb/s using an XDR communication format. This is shown in FIG. 5B presents a block diagram illustrating an embodiment of a memory system 530. The communication format in memory system 550 may include: a low voltage of approximately 0.0.05 V, a high voltage of approximately 0.15 V, a VDDQ of approximately 0.2 V, an input capacitance of approximately 0.75 pF, and a signaling rate of up to 3.2 Gb/s.

Note that the bimodal memory controller that includes both of these interface circuits may use 3% more of the available die area than a unimodal memory controller, and the perimeter of the die may be unchanged.

Embodiments of processes for assembling a memory system and for operating a memory controller are now described.

FIG. 6A presents a flow chart illustrating an embodiment of a process 600 for assembling a memory system. During this method, a first set of signal connectors and corresponding first interface circuits to electrically couple at least part of a memory-controller I/O bus in a memory controller to at least part of an external, memory-system I/O bus is provided (610). Then, a second, alternative set of signal connectors and corresponding second interface circuits to electrically couple at least the part of the memory-controller I/O bus in a memory controller to at least the part of the external, memory-system I/O bus is provided (612). Next, the memory-controller I/O bus is selectively electrically coupled with the external, memory-system I/O bus using either the first set of signal connectors or the second set of signal connectors based on communication characteristics of the memory system (614), where a remaining set of signal connectors, which can be either the first set of signal connectors or the second set of signal connectors, remains selectively electrically uncoupled from the external, memory-system I/O bus.

FIG. 6B presents a flow chart illustrating an embodiment of a process 650 for operating a memory controller. During this method, which one of a first interface circuit and a second interface circuit to use to communicate signals via an external, electrical path is identified (660). Note that the first interface circuit communicates first signals having a first communication format and the second interface circuit communicates second signals having a second communication format. Moreover, the signals are communicated with the external electrical path using the identified interface circuit (662).

In some embodiments of the processes 600 (FIG. 6A) and/or 650, there are fewer or additional operations. Moreover, two or more operations may be combined into a single operation and/or a position of one or more operations may be changed.

Devices and circuits described herein may be implemented using computer-aided design tools available in the art, and embodied by computer-readable files containing software descriptions of such circuits. These software descriptions may be: behavioral, register transfer, logic component, transistor and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email.

Note that physical files may be implemented on machine-readable media such as: 4 mm magnetic tape, 8 mm magnetic tape, 3½ inch floppy media, CDs, DVDs, and so on.

Figure 7:
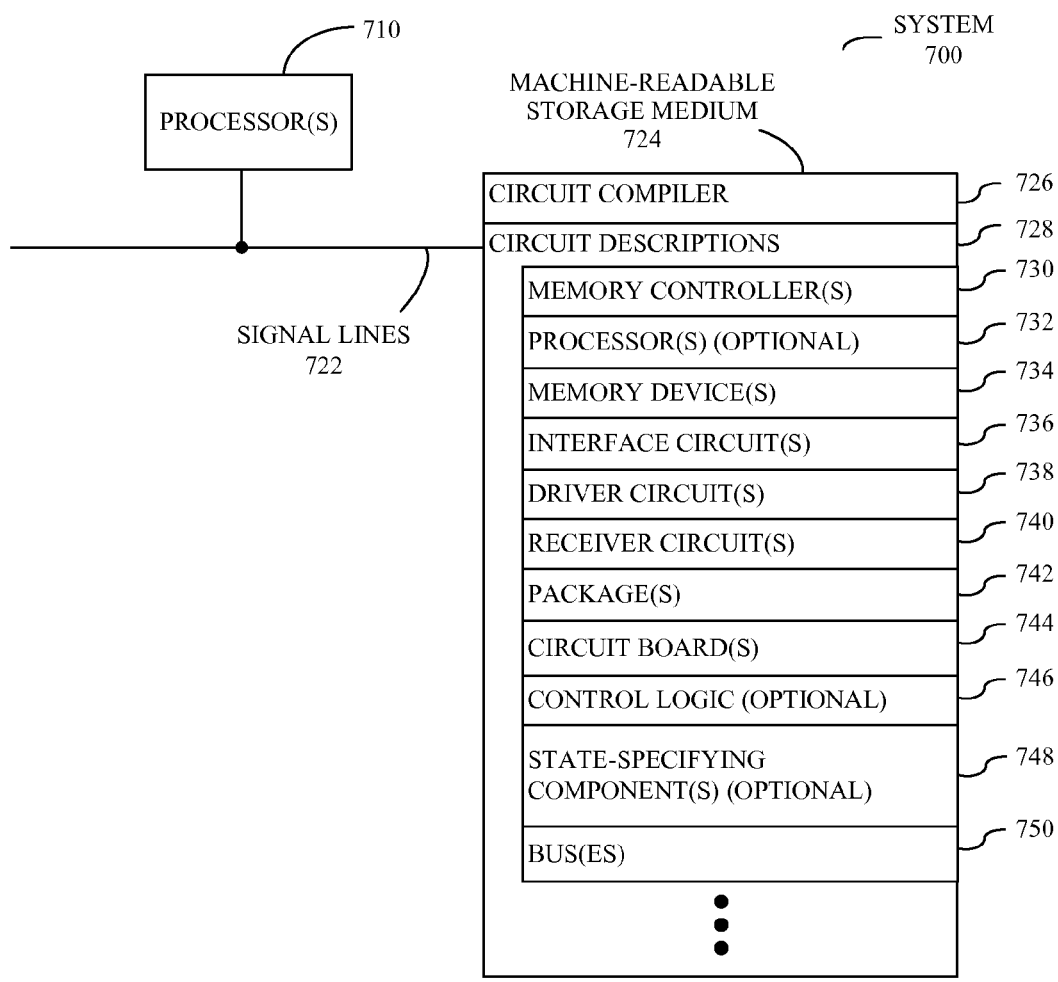
FIG. 7 is a block diagram illustrating an embodiment of a system.

FIG. 7 presents a block diagram illustrating an embodiment of a system 700 that stores such computer-readable files. This system may include at least one data processor or central processing unit (CPU) 710, machine-readable storage medium 724 and one or more signal lines or communication buses 722 for coupling these components to one another. Machine-readable storage medium 724 may include high-speed random access memory and/or non-volatile memory, such as: ROM, RAM, EPROM, EEPROM, flash, one or more smart cards, one or more magnetic disc storage devices, and/or one or more optical storage devices.

Machine-readable storage medium 724 may store a circuit compiler 726 and circuit descriptions 728. Circuit descriptions 728 may include descriptions of the circuits, or a subset of the circuits discussed above with respect to FIGS. 1A-5. In particular, circuit descriptions 728 may include circuit descriptions of: one or more memory controllers 730, optional processors 732, one or more memory devices 734, one or more interface circuits 736, one or more driver circuits 738, one or more receiver circuits 740, one or more packages 742, one or more circuit boards 744, optional control logic 746, optional state-specifying components 748, and/or one or more buses 750.

In some embodiments, system 700 includes fewer or additional components. Moreover, two or more components may be combined into a single component and/or a position of one or more components may be changed.

The preceding description has been presented to enable any person skilled in the art to make and use the disclosed embodiments, and was provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

Moreover, the foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. An apparatus having an internal communication path that is to be coupled with an external conductive path to exchange signaling between the apparatus and an integrated circuit external to the apparatus, the apparatus comprising:
a first interface circuit operable to exchange digital communications between the internal communication path and the external conductive path using a first electrical signaling format;
a second interface circuit operable to exchange the digital communications between the internal communication path and the external conductive path using a second electrical signaling format; and
circuitry operable to couple only an exclusive one of the first interface circuit or the second interface circuit so as to be in communication with the external conductive path.

2. The apparatus of claim 1, where the circuitry comprises a selectively-established electromechanical coupling between the exclusive one of the first interface circuit or the second interface circuit and the external conductive path such that the other of the first interface circuit or the second interface circuit is not electromechanically coupled with the external conductive path.

3. The apparatus of claim 2, where the selectively-established electromechanical coupling comprises a solder ball connection.

4. The apparatus of claim 2, where the selectively-established electromechanical coupling comprises a wire bond connection that electrically couples a die with an electrical contact.

5. The apparatus of claim 1, where the integrated circuit external to said apparatus is a second integrated circuit, and where the first interface circuit and the second interface circuit are embodied as part of a first integrated circuit.

6. The apparatus of claim 5, further comprising a package that mounts the first integrated circuit.

7. The apparatus of claim 6, where the circuitry operable to couple the exclusive one is embodied by an electrical path structure of the package.

8. The apparatus of claim 7, where:
the package includes first and second pads electrically connected with corresponding first and second pads of the first integrated circuit;
the first interface circuit is electrically connected with the first pad;
the second interface circuit is electrically connected with the second pad;
only one of the first or second pads of the package is electrically connected with the external signal path, to thereby electrically couple only the exclusive one of the first interface circuit or the second interface circuit with the external conductive path.

9. The apparatus of claim 5, where the first integrated circuit is embodied as a memory controller integrated circuit.

10. The apparatus of claim 1, further comprising control logic operable to determine whether the first interface circuit or the second interface circuit is to immediately be used in operation of the apparatus, and to deactivate an unused one of the first interface circuit or the second interface circuit.

11. The apparatus of claim 1, further comprising a state-specifying component operable to specify which of the first interface circuit or the second interface circuit is to immediately be used in operation of the apparatus, said circuitry responsive to said state-specifying component to select the exclusive one from the first interface circuit or the second interface circuit.

12. The apparatus of claim 1, where the first electrical signaling format utilizes a first voltage swing and the second electrical signaling format uses a second voltage swing, and where the first interface circuit is operable to transmit the digital communications as an output signal having the first voltage swing, and where the second interface circuit is operable to transmit the digital communications as an output signal having the second voltage swing.

13. The apparatus of claim 1, where the one of the first interface circuit or the second interface circuit not operatively coupled with the external conductive path is electrically isolated from the external conductive path, such that it does not electrically load the external conductive path.

14. An apparatus having an internal communication path that is to be coupled with an external conductive path to exchange signaling between the apparatus and an integrated circuit external to the apparatus, the apparatus comprising:
a first interface circuit operable to exchange digital communications between the internal communication path and the external conductive path using a first electrical signaling format;
a second interface circuit operable to exchange the digital communications between the internal communication path and the external conductive path using a second electrical signaling format; and
means for operatively coupling only an exclusive one of the first interface circuit or the second interface circuit with the external conductive path.

15. The apparatus of claim 14, further comprising control logic operable to determine whether the first interface circuit or the second interface circuit is to immediately be used in operation of the apparatus and to deactivate an unused one of the first interface circuit or the second interface circuit.

16. The apparatus of claim 14, further comprising a state-specifying component operable to specify which of the first interface circuit or the second interface circuit is to immediately be used in operation of the apparatus, said means responsive to said state-specifying component to select the exclusive one from the first interface circuit or the second interface circuit.

17. The apparatus of claim 14, where the first electrical signaling format utilizes a first voltage swing and the second electrical signaling format uses a second voltage swing, and where the first interface circuit is operable to transmit the digital communications as an output signal having the first voltage swing, and where the second interface circuit is operable to transmit the digital communications as an output signal having the second voltage swing.

18. An apparatus having a set of internal communication paths that are to be coupled with respective external conductive paths collectively forming an input/output bus, to exchange signaling between the apparatus and an integrated circuit external to the apparatus, the apparatus comprising:
for each one of the internal communication paths in the set
a first interface circuit operable to exchange digital communications between a corresponding internal communication path and the respective external conductive path using a first electrical signaling format, and
a second interface circuit operable to exchange the digital communications between the corresponding internal communication path and the respective external conductive path using a second electrical signaling format; and
circuitry operable to couple only an exclusive one of the first interface circuits for the set of internal communication paths or the second interface circuits for the set of internal communication paths with the respective external conductive paths.

19. The apparatus of claim 18, where the circuitry comprises, for each one of the internal communication paths in the set, a selectively-established electromechanical coupling between the exclusive one of the first interface circuit or the second interface circuit with the respective external conductive path, such that the other of the first interface circuit or the second interface circuit for each internal communication path is not electromechanically coupled with the respective external conductive path.

20. The apparatus of claim 18, where:
the integrated circuit external to said apparatus is a second integrated circuit;
the first interface circuit and the second interface circuit are embodied as part of a first integrated circuit; and
said apparatus further comprises a package that mounts the first integrated circuit.

21. The apparatus of claim 20, where, for each one of the internal communication paths in the set, the circuitry operable to couple the exclusive one is embodied by a respective electrical path structure of the package.

22. The apparatus of claim 18, further comprising control logic operable to determine whether the first interface circuits or the second interface circuits are to immediately be used in operation of the apparatus, and to deactivate the other of the first interface circuits or the second interface circuits.

23. The apparatus of claim 18, where the first electrical signaling format utilizes a first voltage swing and the second electrical signaling format uses a second voltage swing, and where the first interface circuit is operable to transmit respective digital communications as an output signal having the first voltage swing, and where the second interface circuit is operable to transmit the respective digital communications as an output signal having the second voltage swing.

* * * * *